US006958710B2

(12) United States Patent
Zhang et al.

(10) Patent No.: US 6,958,710 B2
(45) Date of Patent: Oct. 25, 2005

(54) UNIVERSAL DISPLAY MEDIA EXPOSURE MEASUREMENT

(75) Inventors: Jack K. Zhang, Ijamsville, MD (US); Jack C. Crystal, Owings Mill, MD (US); James M. Jensen, Columbia, MD (US)

(73) Assignee: Arbitron Inc., Columbia, MD (US)

( * ) Notice: Subject to any disclaimer, the term of this patent is extended or adjusted under 35 U.S.C. 154(b) by 396 days.

(21) Appl. No.: 10/329,132

(22) Filed: Dec. 24, 2002

(65) Prior Publication Data

US 2004/0122727 A1 Jun. 24, 2004

(51) Int. Cl.[7] .............................................. G08G 1/123
(52) U.S. Cl. ....................... 340/999; 340/905; 455/517
(58) Field of Search ................................ 340/999, 905, 340/933, 825.49, 573.1; 455/517

(56) References Cited

U.S. PATENT DOCUMENTS

| | | | | |
|---|---|---|---|---|
| 5,214,793 | A * | 5/1993 | Conway et al. | 455/500 |
| 5,510,828 | A * | 4/1996 | Lutterbach et al. | 725/138 |
| 5,612,741 | A * | 3/1997 | Loban et al. | 348/383 |
| 5,848,129 | A * | 12/1998 | Baker | 379/67.1 |
| 5,923,252 | A * | 7/1999 | Sizer et al. | 340/573.1 |
| 6,252,522 | B1 * | 6/2001 | Hampton et al. | 340/905 |
| 6,484,148 | B1 * | 11/2002 | Boyd | 705/14 |

* cited by examiner

*Primary Examiner*—John Tweel
(74) *Attorney, Agent, or Firm*—Cowan, Liebowitz & Latman P.C.; Eugene L. Flanagan, III

(57) ABSTRACT

Systems, methods and devices for gathering data concerning exposure of predetermined survey participants to billboards are provided. A portable transmitter is arranged to transmit a signal containing survey participant data, and a receiver located proximately to the billboard serves to receive the signal transmitted by the transmitter.

140 Claims, 7 Drawing Sheets

UNIVERSAL DISPLAY MEDIA EXPOSURE MEASUREMENT

FIELD OF THE INVENTION

The present invention generally relates to systems, methods and devices for measuring the exposure of predetermined survey participants to billboards.

BACKGROUND OF THE INVENTION

It is desired to estimate the exposure of persons to billboards which are often displayed in outdoor settings, such as along roads, highways, railways and walkways, as well as in various indoor settings, such as in malls, subway stations, railway stations, bus stations, airports, building lobbies, etc. Moreover, in addition to information concerning the numbers of persons exposed to such billboards, information concerning the days and times such exposure takes place and information concerning the particular individuals so exposed is also highly desired.

It has been proposed to employ global positioning satellite (GPS) systems to track the positions of vehicles during a period of time, and then to compare the paths of the tracked vehicles with the known locations of billboards in order to determine which billboards the tracked vehicles passed by.

This proposed technique, however, suffers from a number of disadvantages. One such disadvantage is that the technique is limited to outdoor use only due to the drastic weakening of GPS signals caused by building structures and the like. As such, the exposure to billboards displayed in indoor settings, such as in malls, subway stations, railway stations, bus stations, airports, building lobbies, etc., cannot be accurately measured using this proposed system. Another disadvantage is that the proposed GPS-based system tracks only vehicles rather than individual people. Therefore, the data collected has little or no direct correlation to the persons in the vehicle being tracked. Not only does the system not allow demographic information about the persons in the vehicle to be collected, but it does not even allow the number of persons in the vehicle to be ascertained.

Still another disadvantage is that GPS systems may be considered intrusive, in that they track the movement of people no matter where they go. Persons concerned about maintaining their privacy may be unlikely to volunteer for participation in such a billboard exposure survey.

Another system which has been proposed for measuring billboard exposure involves locating a transmitter proximate to the billboards for which exposure is to be measured and providing survey participants with portable receiving devices. The transmitters broadcast a signal that carries information related to the billboards, which signal is received and stored by the portable receiving devices.

This proposed technique, however, also suffers from a number of disadvantages. One disadvantage is that when numerous billboards are located in close proximity to one another, as is often the case in indoor settings or in high traffic outdoor settings, the signals broadcast by the transmitters associated with these billboards may conflict with one another such that the portable receiving devices cannot correctly identify at least some of the broadcast signals. As such, the estimates of exposure to at least some of the billboards may be grossly inaccurate. While techniques are available to provide a means for distinguishing among the various broadcast signals, these techniques add substantial complexity to the portable receiving devices. Since these are not mass market devices, their unit cost is substantially increased as a result.

Another disadvantage of the proposed technique relates to the fact that the data collected by the portable receivers must be subsequently downloaded by the survey participants, e.g., via a telephone line or computer link, for processing by a processing facility. This adds a further level of complexity to the system and thus still further expense.

SUMMARY OF THE INVENTION

For this application the following terms and definitions shall apply, both for the singular and plural forms of nouns and for all verb tenses:

The term "data" as used herein means any indicia, signals, marks, symbols, domains, symbol sets, representations and any other physical form or forms representing information, whether permanent or temporary, whether visible, audible, acoustic, electric, magnetic, electromagnetic or otherwise manifested. The term "data" as used herein to represent certain information in one physical form shall be deemed to encompass any and all representations of the same information in a different physical form or forms.

The term "media data" as used herein means data which is widely accessible, whether optically observable, over-the-air, or via cable, satellite, network, internetwork (including the Internet), distributed on storage media, or otherwise, without regard to the form or content thereof.

The term "transmitter" as used herein means any device which radiates or distributes a signal, whether optical, acoustic, electric, magnetic, electromagnetic or otherwise manifested.

The term "receiver" as used herein means any device which acquires a signal, whether optical, acoustic, electric, magnetic, electromagnetic or otherwise manifested.

The terms "coupled", "coupled to" and "coupled with" as used herein each means a relationship between or among two or more devices, apparatus, files, programs, media, components, networks, systems, subsystems and/or means, constituting any one or more of (a) a connection whether direct or through one or more other devices, apparatus, files, programs, media, components, networks, systems, subsystems or means, (b) a communications relationship whether direct or through one or more other devices, apparatus, files, programs, media, components, networks, systems, subsystems, or means, or (c) a functional relationship in which the operation of any one or more thereof depends, in whole or in part, on the operation of any one or more others thereof.

The terms "communicate" and "communication" as used herein include both conveying data from a source to a destination, and delivering data to a communications medium, system or link to be conveyed to a destination.

The term "processor" as used herein means processing devices, apparatus, programs, circuits, systems and subsystems, whether implemented in hardware, software or both and whether for processing analog and/or digital data.

In accordance with an aspect of the present invention, a system for measuring the exposure of survey participants to a billboard is provided. The system comprises at least one portable transmitter arranged to be carried on the person of at least one survey participant, the at least one portable transmitter operative to transmit signals containing survey participant data; a receiver/transmitter arranged to receive the signals containing survey participant data from the at least one portable transmitter and operative to transmit a signal containing survey participant data; and a receiver located proximately to the billboard, the receiver being arranged to receive the signal transmitted by the receiver/transmitter.

In accordance with another aspect of the present invention, a system for measuring the exposure of survey participants to a billboard is provided. The system comprises a portable transmitter arranged to transmit on a continuous basis or from time to time in response to an internal control, a signal containing survey participant data; and a receiver located proximately to the billboard, the receiver serving to receive the signal transmitted by the transmitter.

In accordance with an additional aspect of the present invention, a system for measuring the exposure of survey participants to a billboard is provided. The system comprises a portable transmitter arranged to transmit a signal containing a unique survey participant identifier; and a receiver located proximately to the billboard, the receiver serving to receive the signal transmitted by the transmitter.

In accordance with a further aspect of the present invention, a system for measuring the exposure of survey participants to a billboard is provided. The system comprises a receiver/transmitter arranged to receive a signal containing survey participant data from a transmitter and to transmit a signal containing survey participant data; and a receiver located proximately to the billboard, the receiver serving to receive the signal transmitted by the receiver/transmitter.

In accordance with yet a further aspect of the present invention, a system for measuring the exposure of survey participants to a billboard is provided. The system comprises a receiver located proximately to the billboard, the receiver being arranged to receive a signal indicative of a survey participant's presence in a viewing area of the billboard, the signal including survey participant data; and a communication device operative to communicate the survey participant data to a billboard exposure data producing system for producing billboard exposure data based upon the survey participant data.

In accordance with still a further aspect of the present invention, a portable device for use with a system for measuring the exposure of survey participants to a billboard is provided. The portable device comprises a transmitter arranged to transmit on a continuous basis or from time to time in response to an internal control a signal indicative of the survey participant's presence in a viewing area of the billboard, the signal including survey participant data.

In accordance with yet another aspect of the present invention, a portable billboard and media data exposure monitor arranged to be carried on the person of a participant is provided. The monitor comprises billboard exposure means for producing billboard exposure monitoring data; a media data exposure monitor; and an enclosure containing the billboard exposure means and the media data exposure monitor.

In accordance with still another aspect of the present invention, a transmitter/receiver for use with a system for measuring the exposure of survey participants to a billboard is provided. The transmitter/receiver is arranged to receive first signals containing survey participant data from at least one portable transmitter and to transmit second signals based upon the received first signals to a receiver located proximately to the billboard.

In accordance with a further aspect of the present invention, a method for measuring the exposure of survey participants to a billboard is provided. The method comprises the steps of transmitting a signal containing survey participant data from at least one portable transmitter carried on the person of at least one survey participant; receiving the signal containing survey participant data from the at least one portable transmitter with a receiver/transmitter and transmitting a signal containing survey participant data with the receiver/transmitter; and receiving the signal transmitted by the receiver/transmitter with a receiver located proximately to the billboard.

In accordance with yet still another aspect of the present invention, a method for measuring the exposure of survey participants to a billboard is provided. The method comprises the steps of transmitting on a continuous basis or from time to time in response to an internal control a signal containing survey participant data from a portable transmitter; and receiving the signal transmitted by the transmitter with a receiver located proximately to the billboard.

In accordance with another aspect of the present invention, a method for measuring the exposure of survey participants to a billboard is provided. The method comprises the steps of receiving with a receiver/transmitter a signal containing survey participant data from a transmitter and transmitting with the receiver/transmitter a signal containing survey participant data; and receiving the signal transmitted by the receiver/transmitter with a receiver located proximately to the billboard.

In accordance with still another aspect of the present invention, a method for measuring the exposure of survey participants to a billboard is provided. The method comprises the steps of receiving a signal indicative of a survey participant's presence in a viewing area of the billboard with a receiver located proximately to the billboard, the signal including survey participant data; and communicating the survey participant data to a billboard exposure data producing system for producing billboard exposure data based upon the survey participant data.

In accordance with yet a further aspect of the present invention, a method for measuring the exposure of survey participants to a billboard is provided. The method comprises the step of transmitting with a portable transmitter on a continuous basis or from time to time in response to an internal control a signal indicative of a survey participant's presence in a viewing area of the billboard, the signal including survey participant data.

In accordance with still a further aspect of the present invention, a method for measuring the exposure of survey participants to media data as well as to a billboard is provided. The method comprises the steps of providing a billboard exposure monitoring means and a media data exposure monitor within an enclosure; producing media data exposure data with the media data exposure monitor; and producing billboard exposure data with the billboard exposure monitoring means.

In accordance with still yet another aspect of the present invention, a method for measuring the exposure of survey participants to a billboard is provided. The method comprises the steps of receiving first signals containing survey participant data from at least one portable transmitter; and transmitting second signals based upon the received first signals to a receiver located proximately to the billboard.

The invention and its particular features and advantages will become more apparent from the following detailed description considered with reference to the accompanying drawings.

DETAILED DESCRIPTION OF CERTAIN ADVANTAGEOUS EMBODIMENTS

Figure 1:
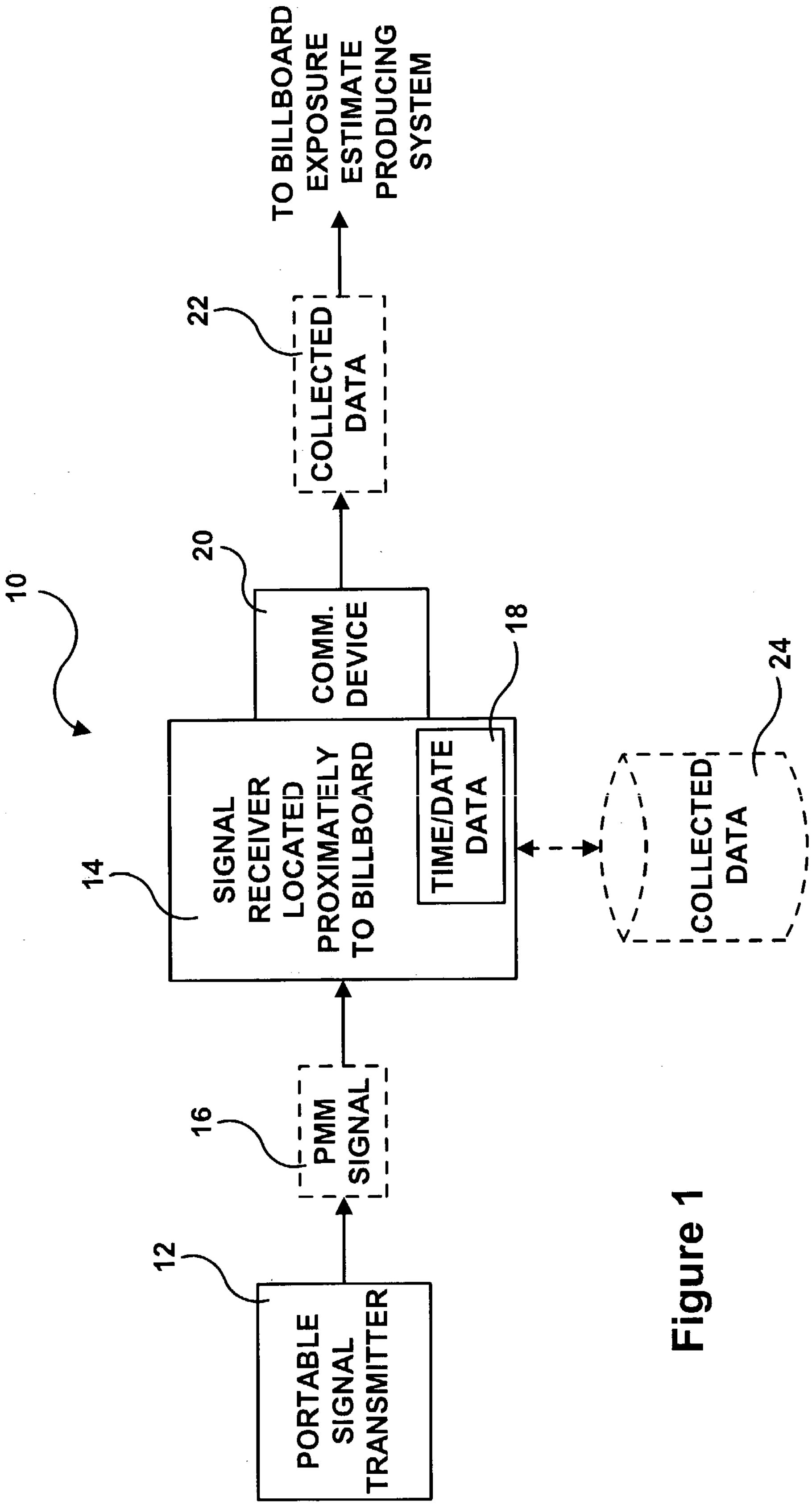
FIG. 1 is a block diagram illustrating a system for measuring the exposure of survey participants to a billboard in accordance with certain embodiments of the present invention.
Figure 2:
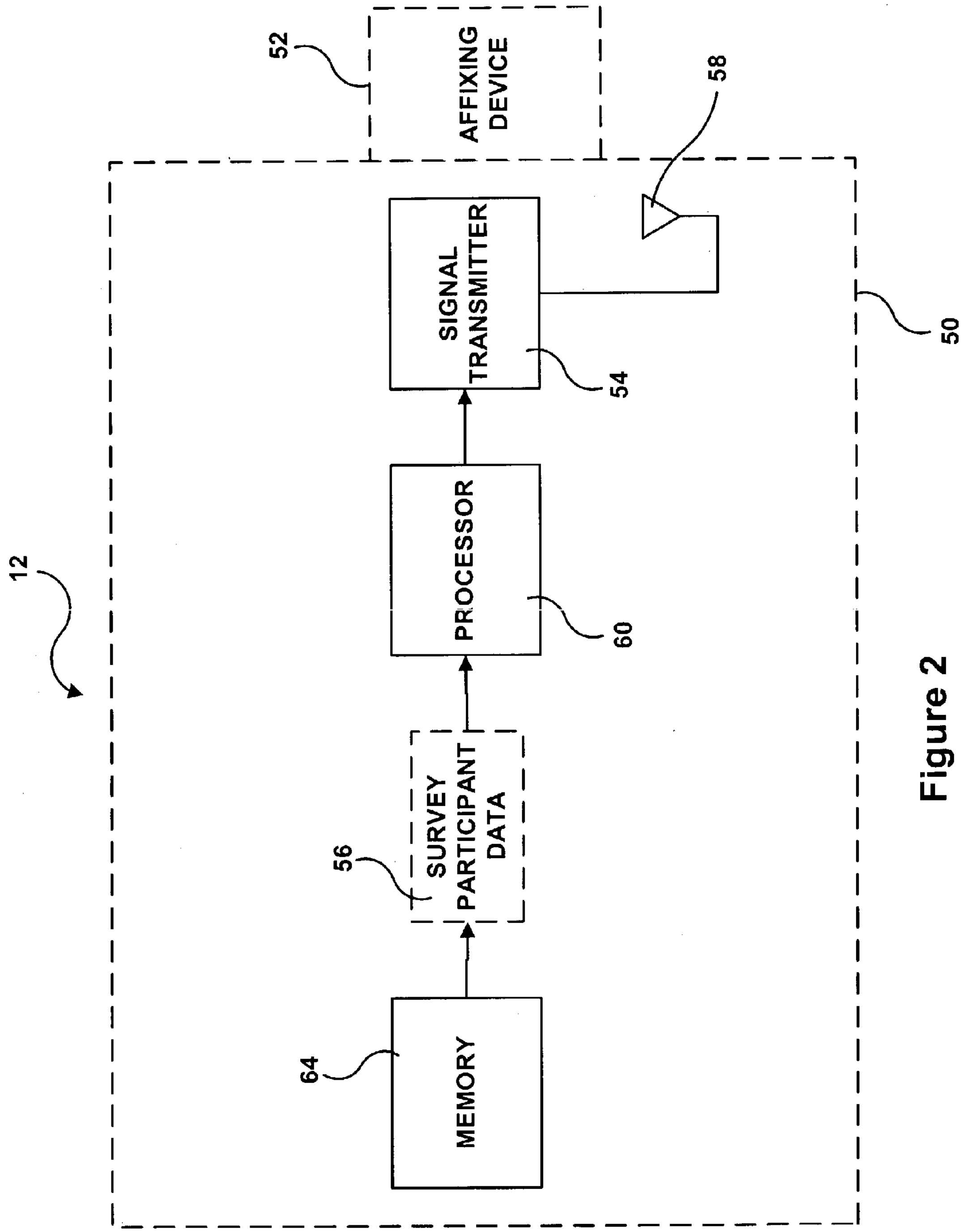
FIG. 2 is a schematic diagram illustrating a portable transmitter in accordance with certain embodiments of the present invention for use with a system for measuring the exposure of survey participants to a billboard.

FIG. 1 schematically illustrates a system 10 for measuring the exposure of survey participants to a billboard in accordance with certain embodiments of the present invention. The system 10 includes a portable transmitter 12 and a receiver 14. The portable transmitter 12, shown in more detail in FIG. 2, is limited in size and configured to be carried about by a survey participant. The portable transmitter 12 in certain embodiments is housed in a housing 50, and may be packaged similarly to a pager, cell phone, PDA or portable media player device. The portable transmitter 12 in certain embodiments includes a clip, pin, belt loop, band, chain or other appropriate means 52 for affixing it to a belt, strap, shirt, blouse or other part of the survey participant's clothing or directly to the survey participant. In certain embodiments, the portable transmitter 12 is packaged in a wrist watch, article of jewelry or in any other article or device of a kind which is or may be carried about. In other embodiments, the portable transmitter 12 includes means 52 for mounting the transmitter 12 on or in a vehicle in which the survey participant is traveling, such as a clip for attachment to a visor, a loop for attachment to a key ring, a magnet, a clamp, a screw or a hook-and-loop fastening system for allowing the portable transmitter 12 to be detachably connected to the dash or window of the vehicle or elsewhere on or in the vehicle.

The portable transmitter 12 includes a signal transmitter 54 which transmits a signal 16 containing survey participant data 56. In embodiments which transmit RF (e.g., microwave) signals, an antenna 58 or the like is coupled with the output of the signal transmitter 54. In certain embodiments, a processor 60 is provided for controlling the various operations of portable transmitter 12. The survey participant data 56 may comprise, for example, a unique identifier which identifies the particular portable transmitter 12 and/or the particular survey participant carrying the particular portable transmitter 12. Instead of, or in addition to, a unique identifier, the survey participant data 56 may include personal information (e.g., name, address, etc.) and/or demographic information (e.g., age, sex, race, etc.) concerning the survey participant carrying the portable transmitter 12. In certain embodiments, the portable transmitter 12 transmits the signal 16 containing survey participant data continuously. In other embodiments, the portable transmitter 12 transmits the signal 16 containing survey participant data in response to an internal control (e.g. produced by processor 60), such as periodically or otherwise from time to time. In certain embodiments, the portable transmitter 12 also includes a memory 64 which serves to store the survey participant data 56 for subsequent transmission.

The receiver 14 is located proximately to the billboard for which exposure of survey participants is being measured. In certain embodiments, the receiver 14 may be located immediately on or adjacent to the billboard. In other embodiments, the receiver 14 may be located some distance from the billboard. What is important, however, is that the receiver 14 be located with respect to the billboard in such a position that the signal 16 containing survey participant data transmitted by a portable transmitter 12 carried by a survey participant who is within a visually observable area of the billboard is received. In certain embodiments, a single receiver 14 may be associated with two or more billboards if they share a common visually observable area (i.e., the survey participant can observe the two or more billboards at locations from which the signal 16 containing survey participant data is received by the common receiver 14).

The billboards may be located in outdoor settings, such as along roads, highways, railways and walkways, or in various indoor settings, such as in malls, subway stations, railway stations, bus stations, airports, building lobbies, etc.

Figure 3:
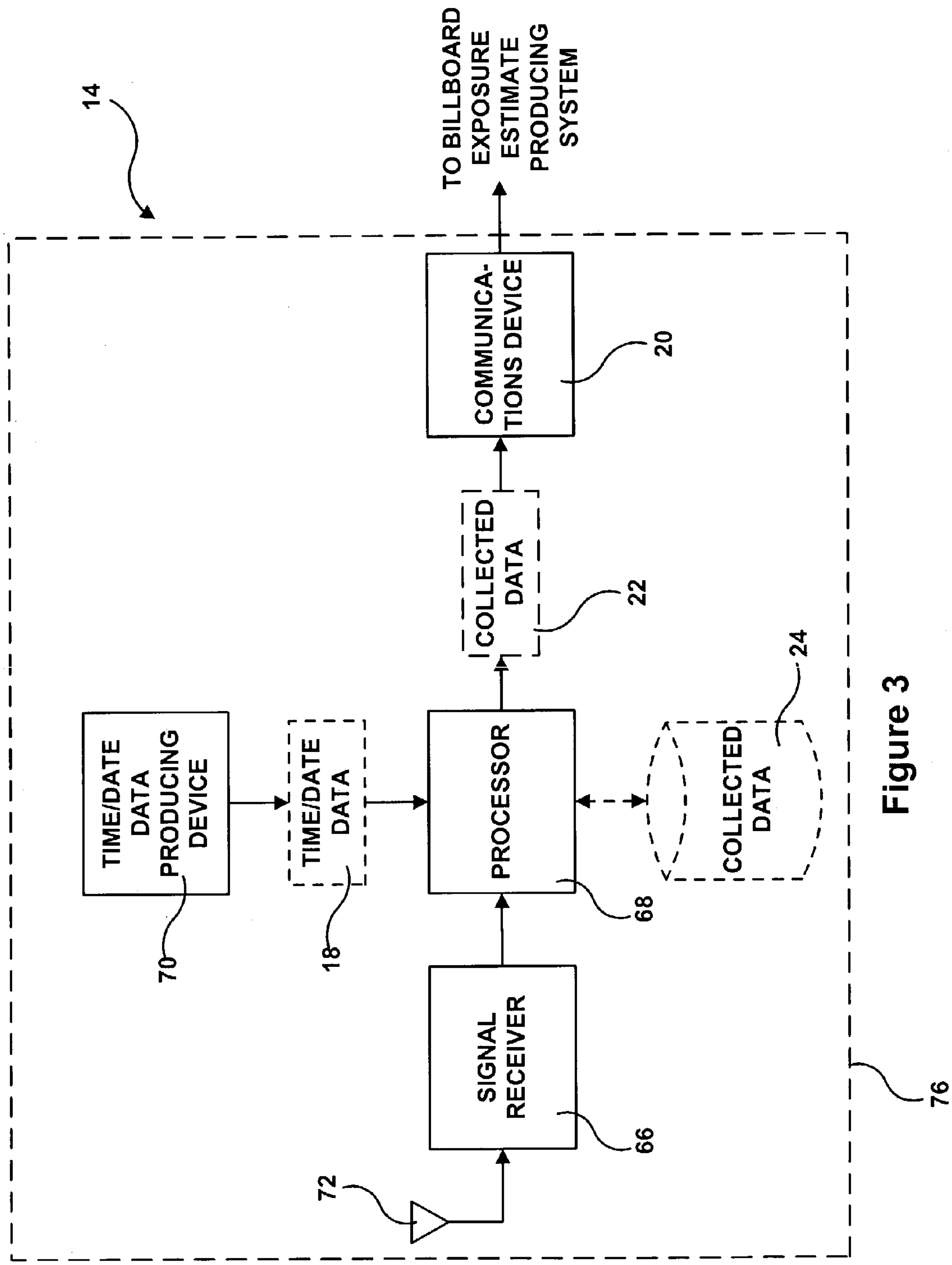
FIG. 3 is a schematic diagram illustrating a receiver in accordance with certain embodiments of the present invention for use with a system for measuring the exposure of survey participants to a billboard.

The receiver 14, shown in more detail in FIG. 3, includes a signal receiver 66 which receives the signal 16 containing survey participant data from an antenna 72 and a processor 68 which extracts the survey participant data from the signal 16. In certain embodiments the receiver 14 includes a time and/or date data producing device 70 which supplies time and/or date data 18 to the processor 68, which time and/or date data 18 is appended to the survey participant data. This allows the system 10 to track information not only about the survey participants themselves who are exposed to the billboard, but also the times and/or dates when such exposure occurred. By tracking such information it can be estimated, for example, how exposure varies with the time of day and/or the days of the week. In certain embodiments, the time and/or date data 18 is transmitted by the portable transmitter 12 itself along with the signal 16 containing survey participant data and is supplied by means (not shown for purposes of simplicity and clarity) functionally equivalent to device 70.

The receiver 14 also includes a communications device 20 coupled with the processor 68, which communicates the collected data 22 (which comprises the survey participant data extracted from the signal 16 as well as the time and/or date data 18 in embodiments wherein such time and/or date data 18 is provided) to a billboard exposure data producing system for producing billboard exposure data based upon the collected data 22. The communications device 20 may communicate the collected data 22 to the billboard exposure data producing system by any of numerous means, either by wire or wireless, such as by way of telephone lines, data lines, fiber-optic lines, radio transmissions, cell-phone networks, pager networks, etc.

In certain embodiments, the communications device 20 communicates the collected data 22 to the billboard exposure data producing system in real time (i.e., as the survey participant data is received by the receiver 14). In other embodiments, the receiver 14 includes a memory 24, such as a solid state memory or a magnetically readable storage medium, onto which the collected data 22 is stored as it is received. In these various embodiments, the communications device 20 is operative to communicate the stored collected data 22 to the billboard exposure data producing system in real time, from time to time and/or periodically.

When the billboard exposure data producing system receives the collected data 22 from the communications device 20, it produces data estimating exposure to billboards in order to produce reports of interest to billboard owners, advertisers, broadcasters, cablecasters, on-line services, content providers, and the like.

In certain embodiments the portable transmitter 12 transmits the signal 16 containing survey participant data via radio frequency (RF) waves. For example, it may be desirable to transmit in the range of 429–435 MHz, which range is not currently subject to licensing requirements in most countries. In other embodiments the portable transmitter 12 may transmit the signal 16 containing survey participant data via infrared or acoustic waves (such as by inaudible codes), or by employing some other form of energy.

Since billboard exposure data is gathered by providing portable transmitters 12 to only a limited number of survey participants, it is unlikely that unrelated panel members will be present simultaneously within range of any given receiver 14. As such, the likelihood of interference between the transmission of signals 16 of two or more portable transmitters 12 as received by a receiver 14 located proximately to a billboard is very much lower than if signals were to be transmitted by transmitters located proximately to billboards, a group of which may be located closely together. This simplifies system design, thus reducing cost.

The likelihood of interference may be made even lower by employing one or more of a number of relatively simple techniques. One such technique that is employed in certain embodiments is to cause the portable transmitters 12 carried by survey participants to transmit signal 16 periodically or from time to time. For example, if portable transmitters transmit a 0.5 second signal every 10 seconds, it is unlikely that signals transmitted by two portable transmitters would overlap and interfere with one another. Another technique which is employed in certain embodiments is to cause the portable transmitters 12 carried by survey participants to transmit signal 16 on various different frequencies. Thus, even if two survey participants were located in the same area, there would be a reduced likelihood of interference because it would be likely that the portable transmitters 12 carried by each survey participant would be transmitting on different frequencies. This likelihood is increased by assuring that survey participants likely to travel together (e.g., members of the same family) are provided with portable transmitters 12 transmitting on different frequencies or at different times.

Other techniques for reducing the likelihood of signal interference are employed in various other embodiments. For example, the receivers 14 and/or portable transmitters 12 in certain embodiments are provided with multiplexing capabilities, such as time division multiplexing, frequency division multiplexing, code division multiplexing or the like.

Figure 4:
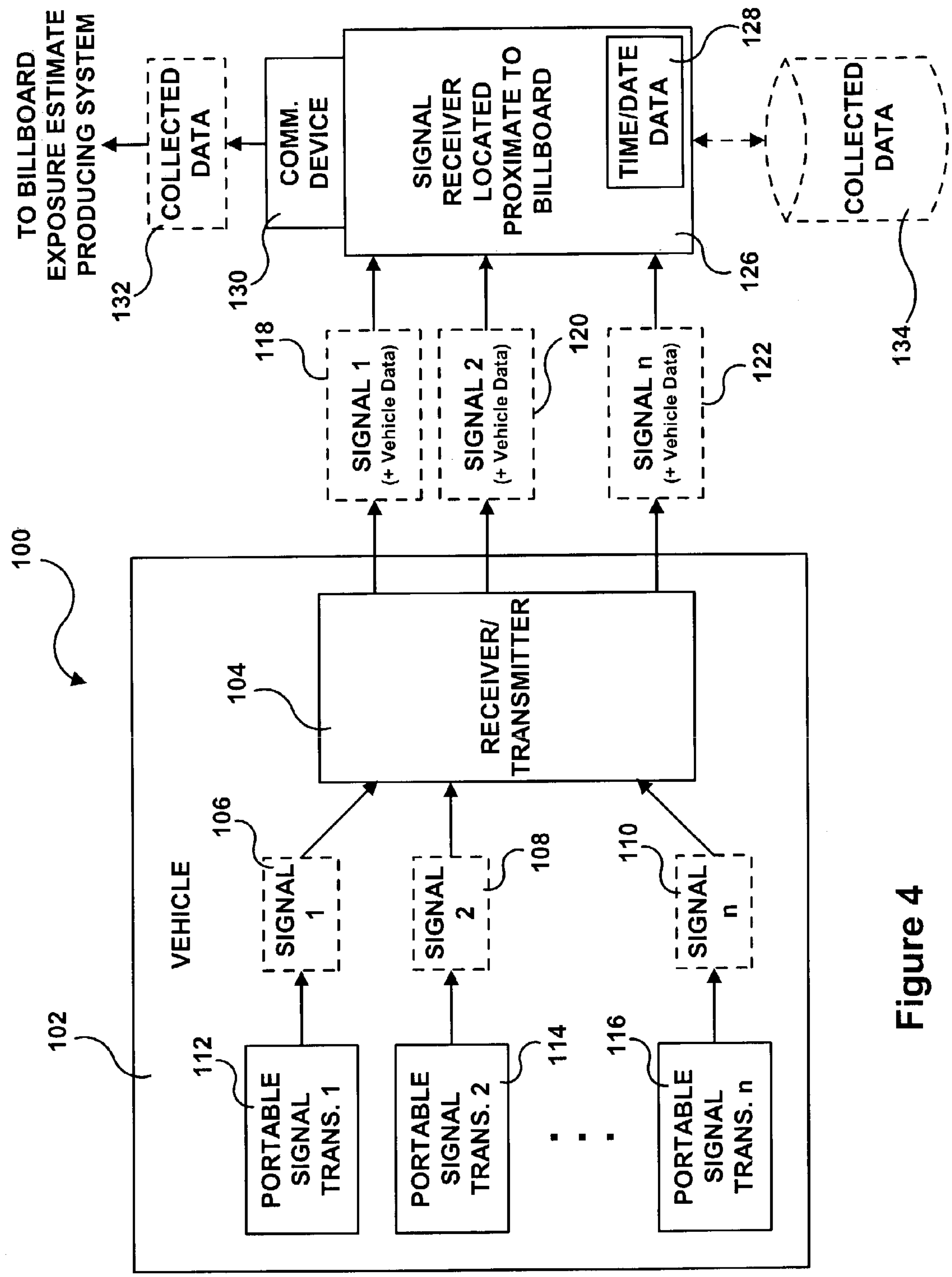
FIG. 4 is a block diagram illustrating a system for measuring the exposure of survey participants to a billboard in accordance with certain embodiments of the present invention where one or more survey participants are traveling in a vehicle.
Figure 5:
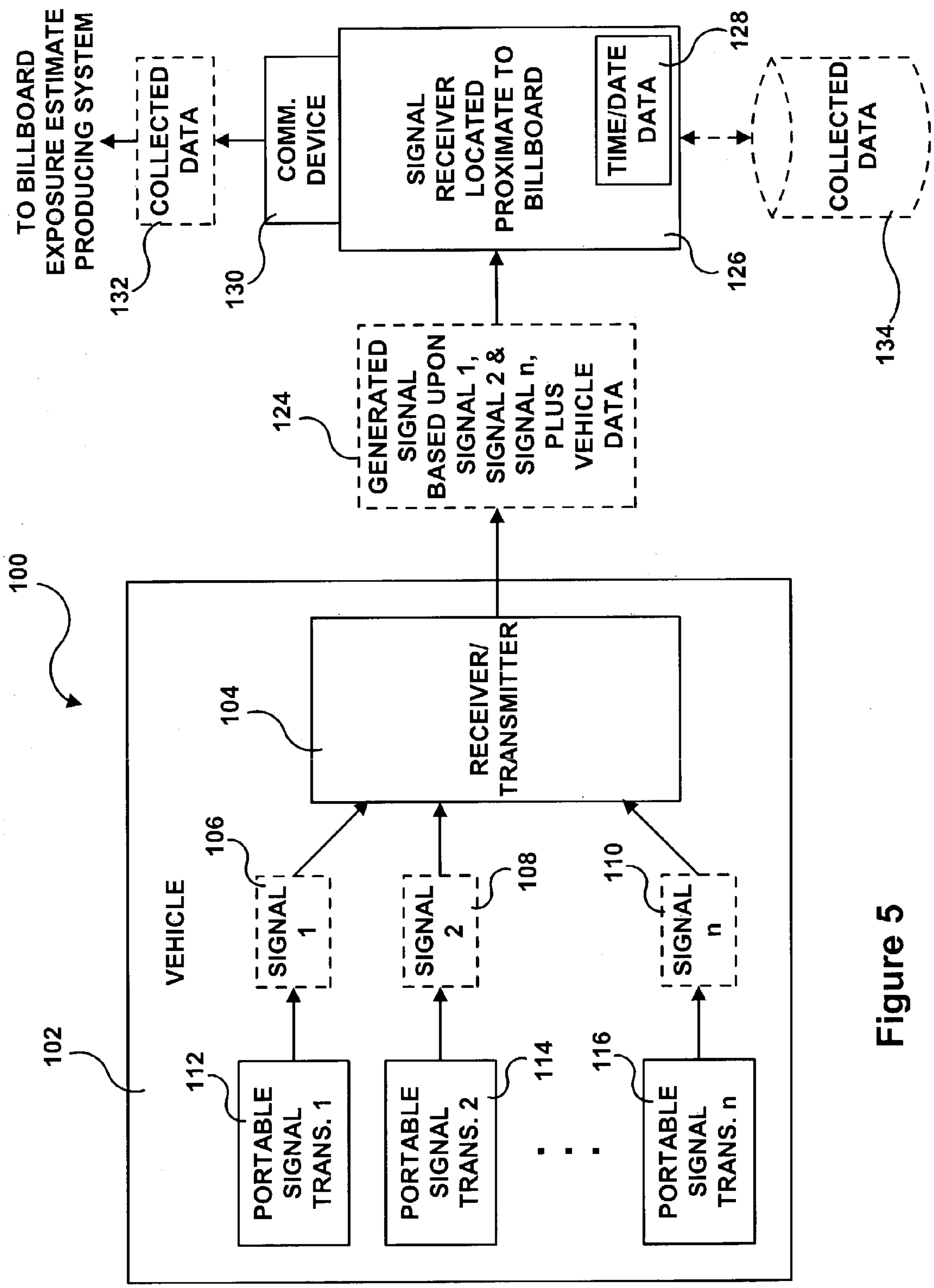
FIG. 5 is a block diagram illustrating a system for measuring the exposure of survey participants to a billboard in accordance with certain further embodiments of the present invention where one or more survey participants are traveling in a vehicle.
Figure 6:
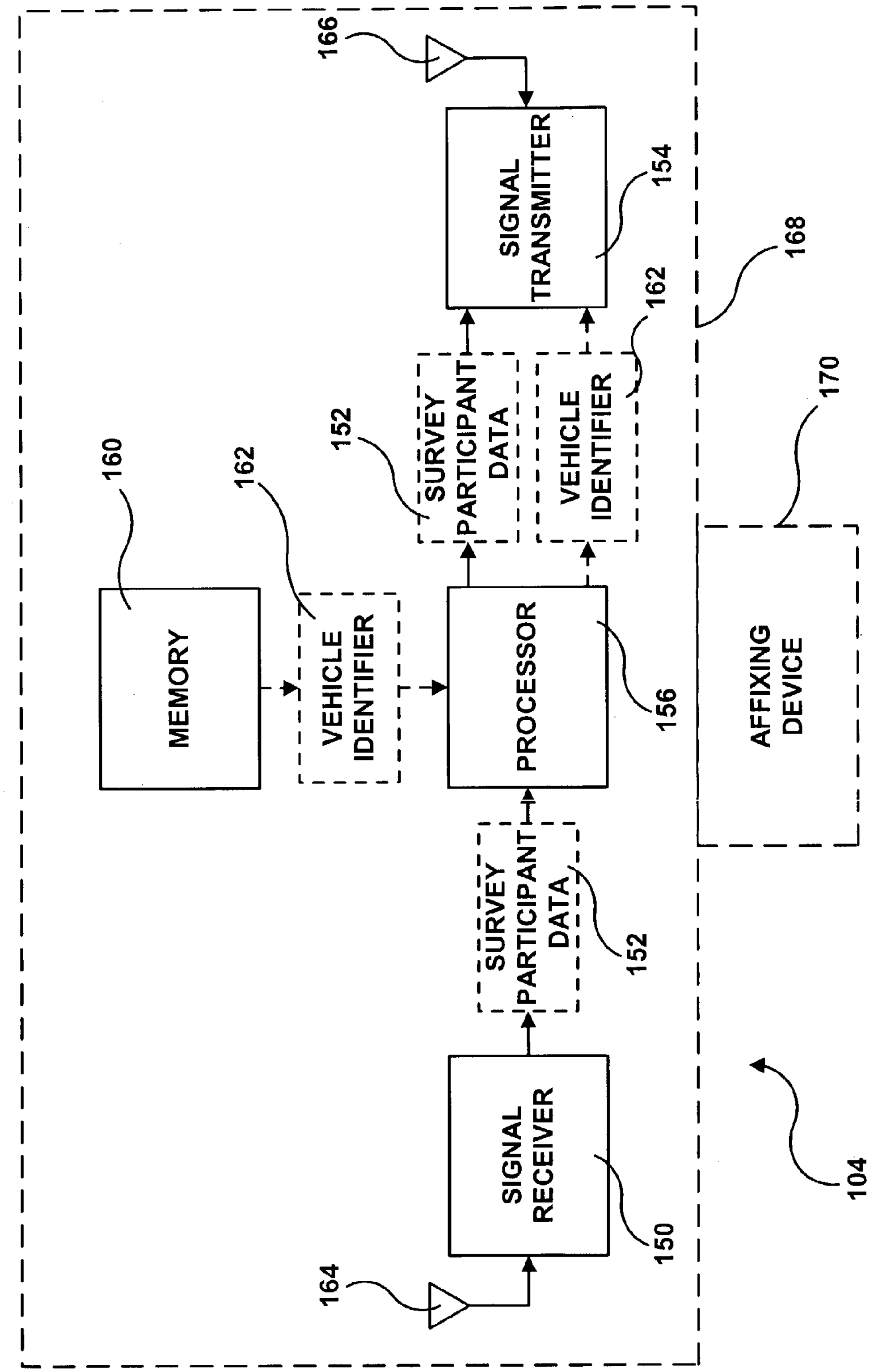
FIG. 6 is a schematic diagram illustrating a receiver/transmitter in accordance with certain embodiments of the present invention which may be used with a system for measuring the exposure of survey participants to a billboard.

FIGS. 4 and 5 are block diagrams illustrating a system 100 for measuring the exposure of survey participants to a billboard in accordance with certain embodiments of the present invention where one or more survey participants are traveling in or on a vehicle 102. The vehicle 102 may comprise a private vehicle, such as an automobile, a truck, a van, a motorcycle, a bicycle, a scooter, or the like, or may comprise a public vehicle, such as a train, a bus, a subway car, an airplane, a monorail or the like. The vehicle 102 has incorporated therein or mounted therein or thereon a receiver/transmitter 104. The receiver/transmitter 104, which is shown in more detail in FIG. 6, includes a signal receiver 150 to receive signals 106, 108, 110 containing survey participant data 152 from one or more personal transmitters 112,114,116 carried by one or more survey participants traveling within the vehicle 102. In certain embodiments a receiver/transmitter functionally equivalent to receiver/transmitter 104 is placed near a pedestrian walkway (such as a sidewalk, plaza, airport concourse, railroad station, atrium, stadium, or the like) to receive the signals from one or more personal transmitters carried by survey participants within view of one or more predetermined billboards.

The receiver/transmitter 104 also includes a signal transmitter 154 to transmit signals 118,120,122 (FIG. 4) or a signal 124 (FIG. 5) containing the survey participant data 152 received in signals 106,108,110. In certain embodiments (as shown in FIG. 4), the survey participant data 152 received by receiver/transmitter 104 in each of signals 106,108,110 is conveyed by a plurality of signals 118,120, 122, each of which corresponds to one of signals 106,108, 110 received by receiver/transmitter 104. In certain of these embodiments, receiver/transmitter 104 comprises a repeater, acting to receive and retransmit signals 106,108,110 as signals 118,120,122; in certain of these embodiments, receiver/transmitter 104 comprises an amplifier, acting to amplify signals 106,108,110 as signals 118,120,122 while maintaining their original data formats (e.g., radio frequency waves, infrared waves, acoustic waves, etc.) such that transmitted signals 118,120,122 have a greater transmission range than received signals 106,108,110; and in certain of these embodiments, receiver/transmitter 104 serves to multiplex the received signals for retransmission in different channels or in a time division or code division multiplex format. In certain embodiments, the receiver/transmitter 104 serves to convert received signals 106,108,110 from one data format to another before transmission of signals 118, 120,122. Combinations of these embodiments and other embodiments for receiver/transmitter 104 are also possible.

In certain embodiments (as shown in FIG. 5), the survey participant data 152 received by receiver/transmitter 104 in each of signals 106,108,110 is extracted by receiver/transmitter 104 and used to generate and transmit a single signal 124 containing the survey participant data extracted from each of signals 106,108,110. Received signals 106,108,110 may share a common data format with transmitted signal 124, or transmitted signal 124 may have a different data format. Transmitted signal 124 preferably has a greater transmission range than received signals 106,108,110.

In certain embodiments, the receiver/transmitter 104 transmits the signals 118,120,122,124 containing survey participant data continuously. In other embodiments, the receiver/transmitter 104 transmits the signals 118,120,122, 124 containing survey participant data in response to an internal control, such as continuously, periodically or otherwise from time to time, as may be controlled by a processor 156. In certain advantageous embodiments, processor 156 includes a motion detector (not shown for purposes of simplicity and clarity) which serves to produce data indicating whether the receiver/transmitter 104, and therefore the vehicle on or in which it is disposed, is moving. Based on the data provided by the motion detector, the processor 156 evaluates whether the vehicle is in motion in order to enable operation of the receiver 150 and/or transmitter 154. Accordingly, the receiver/transmitter 104 in this embodiment will not serve to transmit data from survey participants who may be near the vehicle while it is not in motion, for example, while it is parked.

In certain embodiments, the receiver/transmitter 104 also includes a memory 160 which serves to store the survey participant data 152 for subsequent transmission. In these embodiments, the receiver/transmitter 104 may be operative to transmit the stored survey participant data 152 in real time as it is received, from time to time or periodically, as desired. As such, it is not necessary for the transmitter/receiver 104 to continuously monitor the identities of the survey participants in the vehicle 102. Rather the survey participant data 152 associated with the passenger survey participants can be transmitted continuously by the receiver/transmitter 104, while the collected survey participant data 152 only need be updated and stored periodically or from time to time. For example, if the vehicle 102 comprises a bus, a subway car or the like which makes frequent stops, the survey participant data 152 concerning passengers can be updated more frequently than would be necessary for private vehicles, such as automobiles or the like.

The provision of a memory 160 also allows vehicle data 162 concerning the vehicle 102 in which the receiver/transmitter 104 is mounted to be stored and transmitted as part of signals 118,120,122,124. This allows the system 100 to collect and evaluate information about the types of vehicles the survey participants are traveling in when they view the billboards and/or other information concerning the vehicle, such as its owner. Both of the signal receiver 150 and the signal transmitter 154 are provided with an antenna 164,166 for RF transmission. In embodiments which employ optical or acoustic transmission, appropriate transducers are used in place of antennas 164,166.

The various components of the transmitter/receiver 104 in certain embodiments are housed in a housing 168, which housing 168 may include means 170 for mounting the transmitter/receiver 104 on or in a vehicle 102 in which the survey participant is traveling, such as a clip for attachment to a visor, a loop for attachment to a key ring, a magnet, a clamp, a screw or a hook-and-loop fastening system for allowing the receiver/transmitter 104 to be detachably connected to the dash or window of the vehicle 102.

System 100 also includes a receiver 126, which optionally supplements received survey participant data with time and/or date data 128, a communications device 130 for communicating collected data 132 to a billboard exposure data producing system and a memory 134, each of which elements is functionally equivalent to each respective element described in more detail above with respect to FIGS. 1 and 3. In certain embodiments the receiver/transmitter 104 and/or the personal transmitters 112,114 and 116 provide such time and/or date data.

The various embodiments of the system of the present invention provide distinct advantages over currently known or proposed billboard exposure measuring systems.

Advantages of the system of the present invention over proposed systems which employ global positioning satellite (GPS) systems to track the position of vehicles during a period of time, and then to compare the path of the tracked vehicles with the known locations of billboards in order to determine which billboards the tracked vehicles passed by include the fact that the system of the present invention is not limited to outdoor use, but may also be employed in various indoor settings, the fact that the system of the present invention is not limited to tracking only vehicles rather than individual people, and the fact that the system is not intrusive in that it does not track the movement of people no matter where they go, but rather only determines whether or not survey participants have entered predefined areas.

The system of the present invention also provides numerous advantages over proposed systems which involve locating a transmitter proximate to the billboards for which exposure is to be measured and providing survey participants with portable receiving devices, the transmitters broadcasting a data signal that carries information related to the billboards, which data signal is received and stored by the portable receiving devices. One such advantage of the system of the present invention is that by avoiding the use of transmitters located near billboards, which billboards may be grouped tightly together in some areas, the problem of the signals being broadcast by the transmitters associated with these billboards conflicting with one another such that the portable receiving devices cannot correctly identify at least some of the broadcast signals is avoided, without requiring complex and expensive transmitters or relatively complex portable devices which are expensive to make in the quantities normally used in market research.

Another advantage of the system of the present invention is that the system does not require that data collected by the portable devices carried by the survey participants be subsequently downloaded by the survey participants, e.g., via a telephone line or computer link, for processing by a processing facility. Rather, data is collected by the receivers located proximately to the billboards and communicated to the billboard exposure data producing system without requiring active intervention by the survey participants.

Figure 7:
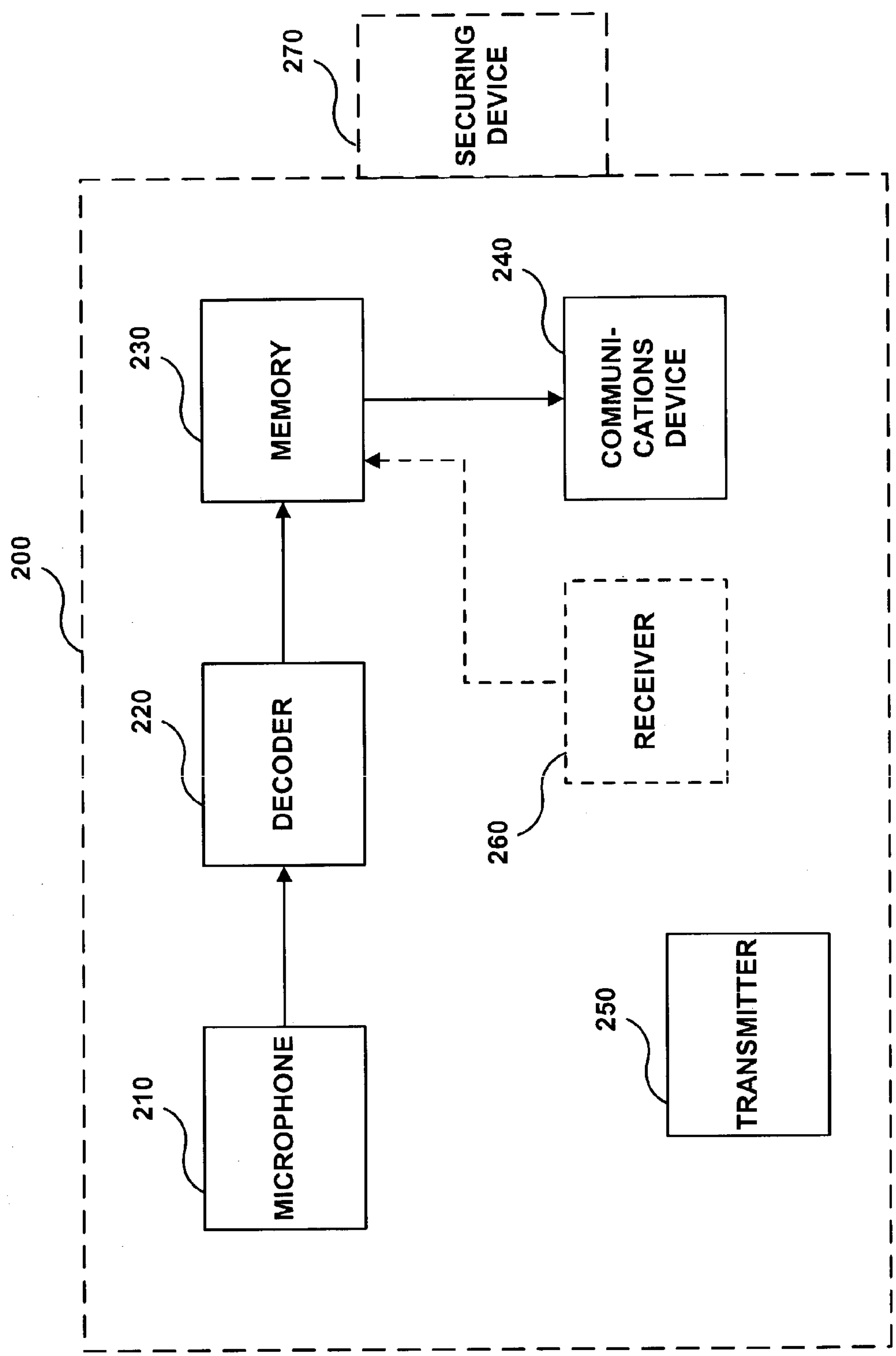
FIG. 7 is a block diagram illustrating certain embodiments of a portable billboard and media data exposure monitor which serves to monitor the exposure of survey participants to billboards as well as to media data.

FIG. 7 illustrates certain embodiments of portable billboard and media data exposure monitoring devices according to certain aspects of the present invention. The devices of FIG. 7 include an enclosure 200; a media data exposure monitor comprising a microphone 210, a processor 220, a memory 230 and a communications device 240; and a billboard exposure means for producing billboard exposure monitoring data. In certain embodiments, the billboard exposure means comprises a transmitter 250, such as a portable transmitter as disclosed hereinabove. In certain embodiments the billboard exposure means comprises a receiver 260 arranged to receive data relating to a billboard, such as identification data, from a transmitter proximate to the billboard, and to store the received data in the memory 230. In certain ones of these embodiments, the receiver 260 is implemented as an RF receiver having a directional gain antenna (not shown for purposes of simplicity and clarity) arranged within the portable monitor so that the area to be monitored corresponds to the area within the view of the survey participant.

The enclosure 200 in certain embodiments is similar in size to a pager device, cell phone, PDA, or portable media player or else is packaged in a wrist watch, article of jewelry or any other article or device of a kind which is or may be carried about. In certain embodiments it is provided with a securing device 270 to enable the portable device to be carried by or attached to the person of an audience member, and in various ones of these embodiments the device 270 comprises a clip, pin, belt loop, band, chain, or other appropriate means for affixing it to a belt, strap, shirt, blouse, or other part of the survey participant's clothing or directly to the participant.

The microphone of the media data exposure monitor transduces acoustic energy to which the survey participant is exposed to produce acoustic data. The acoustic data is coupled from the microphone 210 to the processor 220 which extracts media data exposure data therefrom. In certain embodiments the processor 220 serves to decode an ancillary code included in audio media data for use in identifying or characterizing the audio media data, and any accompanying video data. Suitable decoding techniques for this purpose are the subject of U.S. Pat. Nos. 5,450,490 and 5,764,763 to Jensen, et al., U.S. Pat. No. 5,579,124 to Aijala, et al., U.S. Pat. Nos. 5,574,962, 5,581,800 and 5,787,334 to Fardeau, et al., U.S. patent application Ser. No. 09/318,045, in the names of Neuhauser, et al. filed May 25, 1999, U.S. patent application Ser. No. 09/948,283 to Kolessar, et al. filed Sep. 7, 2001 and U.S. patent application Ser. No. 10/302,309 to Jensen, et al., filed Nov. 22, 2002, each of which is assigned to the assignee of the present application and all of which are incorporated herein by reference.

Still other suitable decoding techniques are the subject of PCT Publication WO 00/04662 to Srinvasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al., all of which are incorporated herein by reference.

In certain embodiments the processor 220 extracts a signature from the acoustic data for use in identifying media data to which the participant is exposed. In such embodiments the processor 220 either is additionally provided with the capability to decode ancillary codes in the acoustic data or else serves only to extract signatures therefrom.

Suitable techniques for extracting signatures from acoustic data are disclosed in U.S. Pat. No. 5,612,729 to Ellis, et al. and in U.S. Pat. No. 4,739,398 to Thomas, et al., each of which is assigned to the assignee of the present invention and both of which are incorporated herein by reference.

Still other suitable techniques are the subject of U.S. Pat. No. 2,662,168 to Scherbatsoy, U.S. Pat. No. 3,919,479 to Moon, et al., U.S. Pat. No. 4,697,209 to Kiewit, et al., U.S. Pat. No. 4,677,466 to Lert, et al., U.S. Pat No 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,531 to Kenyon, et al., U.S. Pat. No. 4,230,990 to Lert, et al., U.S. Pat. No. 5,594,934 to Lu, et al., European Published Patent Application EP 0887958 to Bichsel and PCT publication WO91/11062 to Young, et al., all of which are incorporated herein by reference.

The decoder/processor 220 stores the decoded ancillary codes and/or signatures, or else data representing or derived from the foregoing in the memory 230, from which it is communicated by the device 240 to a processing facility for use in producing audience measurement data. In certain embodiments, the data from the processor 220 is provided to the device 240 for communication without prior storage in memory 230.

In certain embodiments, in place of or in addition to microphone 210, a data input (not shown for purposes of simplicity and clarity) serves to receive media data or media exposure data for storage in memory 230 and/or communication by device 240. Such data input in certain ones of these embodiments comprises manually-operable switches used by the participant to input media data exposure data, an infrared sensor to input remote control data, video media data, or media data exposure data from a stationary unit, an RF receiver to receive RF or intermediate frequency media data or media exposure data from a media data receiver or stationary unit, etc.

The embodiments of FIG. 7 provide the ability to gather both billboard exposure data and media exposure data for the same participants. Such embodiments thus provide data enabling comprehensive reporting of the combined effectiveness of billboard advertising and media advertising which can be categorized by age group, sex, ethnicity, income level, education, geographic area and any other desired demographic category or categories.

The embodiments of FIG. 7 also enable the same panel of survey participants to gather both billboard and media data exposure data substantially reducing the cost of gathering both kinds of data. The panel member need only wear the monitors, so that their participation is essentially passive. Moreover, since the billboard and media data exposure monitoring functions carried out in the portable monitors share resources, such as a common enclosure and power supply, the cost of supplying monitors to carry out such combined monitoring functions is much lower than the cost of providing separate devices for each. In those embodiments which monitor billboard exposure by means of a receiver in the portable monitor, even greater cost advantages accrue since data processing, storage and communications resources are shared by the billboard exposure and media data exposure monitoring functions.

What is claimed is:

1. A system for measuring the exposure of survey participants to a billboard, the system comprising:

at least one portable transmitter arranged to be carried on the person of at least one survey participant, the at least one portable transmitter operative to transmit signals containing survey participant data;

a receiver/transmitter arranged to receive the signals containing survey participant data from the at least one portable transmitter and operative to transmit a signal containing survey participant data; and a receiver located proximately to the billboard, the receiver being arranged to receive the signal transmitted by the receiver/transmitter.

2. The system of claim 1 wherein the at least one portable transmitter comprises a plurality of portable transmitters each arranged to be carried on the person of one of a plurality of survey participants and wherein each of the plurality of portable transmitters is operative to transmit a signal containing survey participant data.

3. The system of claim 2 wherein the receiver/transmitter is arranged to transmit a plurality of signals, each of the plurality of signals corresponding to a signal from a respective one of the plurality of portable transmitters.

4. The system of claim 2 wherein the receiver/transmitter transmits a single signal containing survey participant data based upon survey participant data contained in a plurality of signals from the plurality of portable transmitters.

5. The system of claim 1 further comprising a portable media monitor arranged to be carried on the person of the at least one survey participant and operative to monitor exposure thereof to media data, the at least one portable transmitter being carried in an enclosure with the portable media monitor.

6. The system of claim 1 wherein the signals received by the receiver/transmitter and the signal transmitted by the receiver/transmitter have the same transmission format.

7. The system of claim 1 wherein the signals received by the receiver/transmitter and the signal transmitted by the receiver/transmitter have different transmission formats.

8. The system of claim 1 wherein the signal transmitted by the receiver/transmitter has a transmission range greater than the signals received by the receiver/transmitter.

9. The system of claim 1 wherein the receiver/transmitter is located in a vehicle.

10. The system of claim 9 wherein the at least one portable transmitter is carried on the person of at least one survey participant traveling in the vehicle.

11. The system of claim 1 wherein the receiver is operative to supplement the survey participant data received by the receiver with data concerning the time and date the signal was received by the receiver.

12. The system of claim 1 further comprising a communication device operative to communicate the survey participant data to a billboard exposure data producing system for producing billboard exposure data based upon the survey participant data.

13. The system of claim 12 wherein the communication device is operative to communicate the survey participant data to the billboard exposure data producing system as the survey participant data is received by the receiver.

14. The system of claim 12 further comprising a memory coupled with the receiver to store the survey participant data and wherein the communication device is operative to communicate the stored survey participant data to the billboard exposure data producing system.

15. A method for measuring the exposure of survey participants to a billboard, the method comprising the steps of:

transmitting a signal containing survey participant data from at least one portable transmitter carried on the person of at least one survey participant;

receiving the signal containing survey participant data from the at least one portable transmitter with a receiver/transmitter and transmitting a signal containing survey participant data with the receiver/transmitter; and receiving the signal transmitted by the receiver/transmitter with a receiver located proximately to the billboard.

16. The method of claim 15 wherein the at least one portable transmitter comprises a plurality of portable transmitters each carried on the person of a respective one of a plurality of survey participants and wherein the plurality of portable transmitters transmit a plurality of signals.

17. The method of claim 15, comprising transmitting the signal containing survey participant data from at least one portable transmitter carried on the person of the at least one survey participant in an enclosure with a media data monitor.

18. The method of claim 16 wherein the receiver/transmitter transmits a plurality of signals, each of the plurality of signals corresponding to one of the plurality of signals received by the receiver/transmitter.

19. The method of claim 16 wherein the receiver/transmitter transmits a single signal containing survey participant data based upon the survey participant data contained in each of the plurality of signals received by the receiver/transmitter.

20. The method of claim 15 wherein the signals received by the receiver/transmitter and the signal transmitted by the receiver/transmitter have the same data format.

21. The method of claim 15 wherein the signals received by the receiver/transmitter and the signal transmitted by the receiver/transmitter have different data formats.

22. The method of claim 15 wherein the signal transmitted by the receiver/transmitter has a transmission range greater than the signals received by the receiver/transmitter.

23. The method of claim 15 further comprising the step of supplementing the survey participant data received by the receiver with data concerning the time and date the signal was received by the receiver.

24. The method of claim 15 further comprising the step of communicating the survey participant data received by the receiver to a billboard exposure data producing system for producing billboard exposure data based upon the survey participant data.

25. The method of claim 24 wherein the step of communicating the survey participant data is performed as the survey participant data is received by the receiver.

26. The method of claim 24 further comprising the step of storing the received survey participant data in a memory and wherein the step of communicating the survey participant data comprises communicating the stored, received survey participant data.

27. A system for measuring the exposure of survey participants to a billboard, the system comprising:

a receiver/transmitter arranged to receive a signal containing survey participant data from a transmitter and to transmit a signal containing survey participant data; and a receiver located proximately to the billboard, the receiver serving to receive the signal transmitted by the receiver/transmitter.

28. The system of claim 27 wherein the signal received by the receiver/transmitter is received from a portable transmitter capable of being carried on the person of a survey participant.

29. The system of claim 28 comprising a portable transmitter capable of being carried on the person of a survey participant and operative to transmit the signal containing survey participant data.

30. The system of claim 29 further comprising means for carrying the portable transmitter on the person of the survey participant.

31. The system of claim 30 wherein the means for carrying the portable transmitter comprises an enclosure for the portable transmitter, further comprising a portable media monitor in the enclosure operative to monitor exposure to media data.

32. The system of claim 27 wherein the receiver/transmitter is located in a vehicle.

33. The system of claim 32 further comprising means for mounting the portable transmitter in the vehicle.

34. The system of claim 32 further comprising a portable transmitter arranged to be carried on the person of a survey participant traveling in the vehicle.

35. The system of claim 27 wherein the signal received by the receiver/transmitter and the signal transmitted by the receiver/transmitter have a common data format.

36. The system of claim 27 wherein the receiver/transmitter is operative to modify a data format of the signal received thereby for transmission to the receiver.

37. The system of claim 27 wherein the signal transmitted by the receiver/transmitter has a transmission range greater than the signal received by the receiver/transmitter.

38. The system of claim 27 wherein the receiver supplements the survey participant data received by the receiver with data concerning the time and date the signal was received by the receiver.

39. The system of claim 27 further comprising a communication device coupled with the receiver to communicate the survey participant data to a billboard exposure data producing system for producing billboard exposure data based upon the survey participant data.

40. The system of claim 39 wherein the communication device is operative to communicate the survey participant data to the billboard exposure data producing system as the survey participant data is received by the receiver.

41. The system of claim 39 further comprising a memory coupled with the receiver to store the survey participant data and wherein the communication device is operative to communicate the stored survey participant data to the billboard exposure data producing system.

42. A method for measuring the exposure of survey participants to a billboard, the method comprising the steps of:

receiving with a receiver/transmitter a signal containing survey participant data from a transmitter and transmitting with the receiver/transmitter a signal containing survey participant data; and receiving the signal transmitted by the receiver/transmitter with a receiver located proximately to the billboard.

43. The method of claim 42 wherein the signal received with the receiver/transmitter is received from a portable transmitter carried on the person of a survey participant.

44. The method of claim 42 further comprising the step of carrying the receiver/transmitter in a vehicle.

45. The method of claim 44 wherein the signal received with the receiver/transmitter is received from a portable transmitter carried on the person of a survey participant traveling in the vehicle.

46. The method of claim 42 wherein the signal received by the receiver/transmitter and the signal transmitted by the receiver/transmitter have the same data format.

47. The method of claim 42 wherein the signal received by the receiver/transmitter and the signal transmitted by the receiver/transmitter have different data formats.

48. The method of claim 42 wherein the signal transmitted by the receiver/transmitter has a transmission range greater than the signal received by the receiver/transmitter.

49. The method of claim 42 further comprising the step of supplementing the survey participant data received by the receiver with data concerning the time and date the signal was received by the receiver.

50. The method of claim 42 further comprising the step of communicating the survey participant data received by the receiver to a billboard exposure data producing system for producing billboard exposure data based upon the survey participant data.

51. The method of claim 50 wherein the step of communicating the survey participant data is performed as the survey participant data is received by receiver.

52. The method of claim 50 further comprising the step of storing the received survey participant data in a memory as it is received and wherein the step of communicating the survey participant data comprises communicating the stored, received survey participant data.

53. A system for measuring the exposure of survey participants to a billboard, the system comprising:

a portable transmitter arranged to transmit, on a continuous basis or from time to time in response to an internal control, a signal containing survey participant data; and a receiver located proximately to the billboard, the receiver serving to receive the signal transmitted by the transmitter.

54. The system of claim 53 wherein the portable transmitter is capable of being carried on the person of a survey participant.

55. The system of claim 54 further comprising means for carrying the portable transmitter on the person of the survey participant.

56. The system of claim 55 further comprising a portable media monitor operative to monitor exposure to media data and carried in an enclosure with the portable transmitter.

57. The system of claim 53 wherein the portable transmitter is capable of being carried in a vehicle in which a survey participant is traveling.

58. The system of claim 57 further comprising means for mounting the portable transmitter in the vehicle.

59. The system of claim 53 wherein the survey participant data comprises a unique identifier.

60. The system of claim 53 wherein the survey participant data comprises demographic information about the survey participant.

61. The system of claim 53 wherein the receiver supplements the survey participant data received by the receiver with data concerning the time and date the signal was received by the receiver.

62. The system of claim 53 further comprising a communication device coupled with the receiver to communicate the survey participant data to a billboard exposure data producing system for producing billboard exposure data based upon the survey participant data.

63. The system of claim 62 wherein the communication device is operative to communicate the survey participant data to the billboard exposure data producing system as the survey participant data is received by the receiver.

64. The system of claim 62 further comprising a memory coupled with the receiver to store the survey participant data as it is received and wherein the communication device is operative to communicate the stored survey participant data to the billboard exposure data producing system.

65. A system for measuring the exposure of survey participants to a billboard, the system comprising:

a portable transmitter arranged to transmit a signal containing a unique survey participant identifier; and, a receiver located proximately to the billboard, the receiver serving to receive the signal transmitted by the transmitter.

66. The system of claim 65 wherein the portable transmitter is capable of being carried on the person of a survey participant.

67. The system of claim 66 further comprising means for carrying the portable transmitter on the person of the survey participant.

68. The system of claim 67 wherein the means for carrying the portable transmitter comprises an enclosure for the portable transmitter, further comprising a portable media monitor in the enclosure operative to monitor exposure to media data.

69. The system of claim 65 wherein the portable transmitter is capable of being carried in a vehicle in which a survey participant is traveling.

70. The system of claim 69 further comprising means for mounting the portable transmitter in the vehicle.

71. The system of claim 65 wherein the receiver is operative to supplement the survey participant identifier received by the receiver with data concerning the time and date the signal was received by the receiver.

72. The system of claim 65 further comprising a communication device coupled with the receiver to communicate the survey participant data to a billboard exposure data producing system for producing billboard exposure data based upon the unique survey participant identifier.

73. The system of claim 72 wherein the communication device is operative to communicate the unique survey participant identifier to the billboard exposure data producing system as the unique survey participant identifier is received by the receiver.

74. The system of claim 72 further comprising a memory coupled with the receiver to store the unique survey participant identifier as it is received and wherein the communication device is operative to communicate stored unique survey participant identifiers to the billboard exposure data producing system.

75. A method for measuring the exposure of survey participants to a billboard, the method comprising the steps of:

transmitting on a continuous basis or from time to time in response to an internal control a signal containing survey participant data from a portable transmitter; and receiving the signal transmitted by the transmitter with a receiver located proximately to the billboard.

76. The method of claim 75 further comprising the step of carrying the portable transmitter on the person of a survey participant.

77. The method of claim 76 wherein the step of carrying the portable transmitter comprises the step of carrying a portable media monitor in an enclosure with the portable transmitter on the person of the survey participant, and comprising monitoring exposure of the survey participant to media data by means of the portable media monitor.

78. The method of claim 75 further comprising the step of carrying the portable transmitter in a vehicle in which a survey participant is traveling.

79. The method of claim 75 further comprising the step of supplementing the survey participant data received by the receiver with data concerning the time and date the signal was received by the receiver.

80. The method of claim 75 further comprising the step of communicating the survey participant data received by the receiver to a billboard exposure data producing system for producing billboard exposure data based upon the survey participant data.

81. The method of claim 80 wherein the step of communicating the survey participant data is performed as the survey participant data is received by receiver.

82. The method of claim 80 further comprising the step of storing the received survey participant data in a memory and wherein the step of communicating the survey participant data comprises communicating the stored, received survey participant data.

83. A system for measuring the exposure of survey participants to a billboard, the system comprising:

a receiver located proximately to the billboard, the receiver being arranged to receive a signal indicative of a survey participant's presence in a viewing area of the billboard, the signal including survey participant data; and a communication device operative to communicate the survey participant data to a billboard exposure data producing system for producing billboard exposure data based upon the survey participant data.

84. The system of claim 83 wherein the receiver is arranged to receive the signal from a portable transmitter carried on the person of a survey participant.

85. The system of claim 84 wherein the receiver is arranged to receive the signal on a continuous basis or from time to time.

86. The system of claim 85 wherein the survey participant data contains a unique survey participant identifier.

87. The system of claim 83 wherein the receiver is operative to supplement the survey participant data with data concerning the time and date the signal was received by the receiver.

88. The system of claim 83 wherein:

the receiver is operative to receive the signal from a receiver/transmitter; and wherein the signal received from the receiver/transmitter is based upon a signal received from a portable transmitter.

89. The system of claim 83 wherein the communication device is operative to communicate the survey participant data to the billboard exposure data producing system as the survey participant data is received by the receiver.

90. The system of claim 83 further comprising a memory operative to store the survey participant data and wherein the communication device is operative to communicate the stored survey participant data to the billboard exposure data producing system.

91. A method for measuring the exposure of survey participants to a billboard, the method comprising the steps of:

receiving a signal indicative of a survey participant's presence in a viewing area of the billboard with a receiver located proximately to the billboard, the signal including survey participant data; and communicating the survey participant data to a billboard exposure data producing system for producing billboard exposure data based upon the survey participant data.

92. The method of claim 91 further comprising the step of, before the receiving step, transmitting a signal indicative of a survey participant's presence in a viewing area of the billboard on a continuous basis or from time to time in response to an internal control by means of a portable transmitter.

93. The method of claim 91 further comprising the step of supplementing the survey participant data with data concerning the time and date the signal was received by the receiver.

94. The method of claim 91 wherein:

the signal is received from a receiver/transmitter; and wherein the signal transmitted by the receiver/transmitter is based upon a signal received from a portable transmitter.

95. The method of claim 91 wherein the step of communicating the survey participant data is performed as the survey participant data is received by the receiver.

96. The method of claim 91 further comprising the step of storing the received survey participant data in a memory and wherein the step of communicating the survey participant data comprises communicating the stored, received survey participant data.

97. A portable device for use with a system for measuring the exposure of survey participants to a billboard, the portable device comprising:

a transmitter arranged to transmit on a continuous basis or from time to time in response to an internal control a signal indicative of the survey participant's presence in a viewing area of the billboard, the signal including survey participant data.

98. The portable device of claim 97 wherein the portable device is arranged to be carried on the person of a survey participant.

99. The portable device of claim 97 wherein the portable device is capable of being carried in a vehicle in which a survey participant is traveling.

100. The portable device of claim 97 wherein the survey participant data comprises a unique identifier.

101. The portable device of claim 97 wherein the survey participant data comprises demographic information about the survey participant.

102. The portable device of claim 97 further comprising a media data monitor arranged to monitor exposure of the survey participant to media data.

103. The portable device of claim 102 wherein the media data monitor comprises an acoustic transducer operative to receive audio media data and to produce non-acoustic media data therefrom, and a detector coupled with the acoustic transducer to receive the non-acoustic media data and operative to produce media data exposure data therefrom.

104. The portable device of claim 103 wherein the detector is operative to detect an ancillary code in the non-acoustic media data.

105. A method for measuring the exposure of survey participants to a billboard, the method comprising the steps of:

transmitting with a portable transmitter on a continuous basis or from time to time in response to an internal control a signal indicative of a survey participant's presence in a viewing area of the billboard, the signal including survey participant data.

106. The method of claim 105 further comprising the step of carrying the portable transmitter on the person of a survey participant.

107. The method of claim 105 further comprising the step of carrying the portable transmitter in a vehicle in which a survey participant is traveling.

108. The method of claim 105 wherein the survey participant data comprises a unique identifier.

109. The method of claim 105 wherein the survey participant data comprises demographic information about the survey participant.

110. The method of claim 105 further comprising the step of monitoring the exposure of the survey participant to media data by means of a portable media data monitor carried on the person of the survey participant in an enclosure with the portable transmitter.

111. The method of claim 110 wherein said monitoring step comprises the steps of:

receiving audio media data in the portable media data monitor and producing non-acoustic media data therefrom; and producing media data exposure data from the non-acoustic media data.

112. The method of claim 111 further comprising the step of detecting an ancillary code in the non-acoustic media data.

113. A portable billboard and media data exposure monitor arranged to be carried on the person of a participant, comprising:

billboard exposure means for producing billboard exposure monitoring data;

a media data exposure monitor; and an enclosure containing the billboard exposure means and the media data exposure monitor.

114. The monitor of claim 113 further comprising means for securing the monitor to the person of the participant.

115. The monitor of claim 113 wherein the billboard exposure means comprises a receiver arranged to receive a billboard proximity signal.

116. The monitor of claim 113 wherein the billboard exposure means comprises a transmitter arranged to transmit participant data to a billboard exposure data receiver.

117. The monitor of claim 113 wherein the media data exposure monitor comprises an acoustic transducer operative to receive audio media data and to produce non-acoustic media data therefrom, and a detector coupled with the acoustic transducer to receive the non-acoustic media data and operative to produce the media data exposure data therefrom.

118. The monitor of claim 117 wherein the detector is operative to detect an ancillary code in the non-acoustic media data.

119. A method for measuring the exposure of survey participants to media data as well as to a billboard, the method comprising the steps of:

providing a billboard exposure monitoring means and a media data exposure monitor within an enclosure;

producing media data exposure data with the media data exposure monitor; and producing billboard exposure data with the billboard exposure monitoring means.

120. The method of claim 119 further comprising the step of securing the enclosure to the person of the survey participant.

121. The method of claim 119 wherein the step of producing billboard exposure data comprises the step of receiving a billboard proximity signal.

122. The method of claim 119 wherein the step of producing billboard exposure data comprises the step of transmitting participant data to a billboard exposure data receiver.

123. The method of claim 119 further comprising the steps of:

receiving audio media data in the media data exposure monitor and producing non-acoustic media data therefrom; and producing media data exposure data from the non-acoustic media data.

124. The method of claim 123 further comprising the step of detecting an ancillary code in the non-acoustic media data.

125. A transmitter/receiver for use with a system for measuring the exposure of survey participants to a billboard, the transmitter/receiver being arranged to receive first signals containing survey participant data from at least one portable transmitter and to transmit second signals based upon the received first signals to a receiver located proximately to the billboard.

126. The system of claim 125 wherein the receiver/transmitter is located in a vehicle.

127. The system of claim 126 wherein the receiver/transmitter is arranged to receive the first signals from at least one portable transmitter carried on the person of at least one survey participant traveling in the vehicle.

128. The system of claim 125 wherein the receiver/transmitter is arranged to transmit the second signals having a common data format as the received first signals.

129. The system of claim 125 wherein the receiver/transmitter is operative to modify a data format of the received first signals for transmission of the second signals.

130. The system of claim 125 wherein the second signals transmitted by the receiver/transmitter have a transmission range greater than the received first signals.

131. The system of claim 125 wherein the at least one portable transmitter comprises a plurality of portable transmitters each arranged to be carried on the person of one of a plurality of survey participants and wherein each of the plurality of portable transmitters is operative to transmit a signal containing survey participant data.

132. The system of claim 131 wherein the receiver/transmitter is arranged to transmit a plurality of signals, each of the plurality of signals corresponding to a signal from a respective one of the plurality of portable transmitters.

133. The system of claim 131 wherein the receiver/transmitter transmits a single signal containing survey participant data based upon survey participant data contained in a plurality of signals from the plurality of portable transmitters.

134. A method for measuring the exposure of survey participants to a billboard, comprising the steps of:

receiving first signals containing survey participant data from at least one portable transmitter; and transmitting second signals based upon the received first signals to a receiver located proximately to the billboard.

135. The method of claim 134 wherein the transmitted second signals have a common data format as the received first signals.

136. The method of claim 134 further comprising, before the transmitting step, the step of modifying a data format of the received first signals to create second signals.

137. The method of claim 134 wherein the transmitted second signals have a transmission range greater than the received first signals.

138. The method of claim 134 wherein the at least one portable transmitter comprises a plurality of portable transmitters each arranged to be carried on the person of one of a plurality of survey participants and wherein each of the plurality of portable transmitters transmits a signal containing survey participant data.

139. The method of claim 138 wherein the transmitting step comprises the step of transmitting a plurality of signals to a receiver located proximately to the billboard, each of the plurality of signals corresponding to a signal from a respective one of the plurality of portable transmitters.

140. The method of claim 138 wherein the transmitting step comprises the step of transmitting a single signal containing survey participant data based upon survey participant data contained in a plurality of signals received from the plurality of portable transmitters.

* * * * *